United States Patent [19]
Tarabulski

[11] Patent Number: 5,924,280
[45] Date of Patent: Jul. 20, 1999

[54] REDUCING NO$_X$ EMISSIONS FROM AN ENGINE WHILE MAXIMIZING FUEL ECONOMY

[75] Inventor: Theodore J. Tarabulski, Brewster, N.Y.

[73] Assignee: Clean Diesel Technologies, Inc., Stamford, Conn.

[21] Appl. No.: 08/833,175

[22] Filed: Apr. 4, 1997

[51] Int. Cl.$^6$ ...................................................... F01N 3/00
[52] U.S. Cl. ................ 60/274; 60/278; 60/286; 60/301
[58] Field of Search ............................ 60/274, 278, 286, 60/301

[56] References Cited

U.S. PATENT DOCUMENTS

| | | |
|---|---|---|
| 4,107,272 | 8/1978 | Mori et al. . |
| 4,138,469 | 2/1979 | Matsuda et al. . |
| 4,393,031 | 7/1983 | Henke . |
| 4,609,342 | 9/1986 | Showalter . |
| 4,891,050 | 1/1990 | Bowers et al. . |
| 4,892,562 | 1/1990 | Bowers et al. . |
| 5,034,020 | 7/1991 | Epperly et al. . |
| 5,209,061 | 5/1993 | Takeshima ................................ 60/284 |
| 5,215,652 | 6/1993 | Epperly et al. . |
| 5,266,083 | 11/1993 | Peter-Hoblyn et al. . |
| 5,357,749 | 10/1994 | Ohsuga et al. ............................ 60/274 |
| 5,431,893 | 7/1995 | Hug et al. . |
| 5,584,265 | 12/1996 | Rao et al. ................................. 123/1 A |
| 5,628,186 | 5/1997 | Schmelz ................................... 60/274 |

FOREIGN PATENT DOCUMENTS

| | | |
|---|---|---|
| 1100292 | 5/1981 | Canada . |
| 0 210 392 | 2/1987 | European Pat. Off. . |
| 0 615 777 A1 | 9/1994 | European Pat. Off. . |
| 90/07561 | 7/1990 | WIPO . |

OTHER PUBLICATIONS

Hultersman, R.J.' "A Selective Catalytic Reduction of NOx from Diesel Engines Using Injection of Urea"; Proefscrift Technische Universiteit Delft; Sep. 1995. (On Order).

Heimrich, Martin J., "Demonstration of Lean NOx Catalytic Converter Technology on a Heavy–Duty Diesel Engine"; SAE Paper No. 970755, International Congress & Exposition; Detroit, MI; Feb. 24–27, 1997.

Psaras, Dimitrois, et al; "Achieving the 2004 Heavy–Duty Diesel Emissions Using Electronic EGR and a Cerium Based Fuel Borne Catalyst"; SAE Paper No. 971089; International Congress & Exposition; Detroit, MI; Feb. 24–27, 1997.

*Primary Examiner*—Thomas E. Denion
*Attorney, Agent, or Firm*—St. Onge Steward Johnston & Reens LLC

[57] ABSTRACT

Exhaust gas recirculation and selective catalytic reduction with urea or other NO$_x$- reducing reagent are employed to enable good fuel economy and low emissions from diesel and lean-burn gasoline engines. EGR is operated at low-load, as well as when problems are experienced with reagent supply or the SCR unit. The SCR is run at its optimum operating conditions of normal to high load, supplanting the need for EGR. The net effect is a circumvention of the known tradeoff between NO$_x$ and poor fuel economy. The novel application of SCR and EGR in combination will provide engines that meet low emissions requirements with existing technology.

5 Claims, 2 Drawing Sheets

5,924,280

REDUCING NO$_x$ EMISSIONS FROM AN ENGINE WHILE MAXIMIZING FUEL ECONOMY

TECHNICAL FIELD

The invention relates to means and methods that enable the safe and reliable reduction of nitrogen oxides (NO$_x$) emissions while permitting a diesel or other lean-burn engine to operate efficiently.

Diesel and lean-burn gasoline engines provide advantages in fuel economy and are favored for this reason. However, they produce large quantities of NO$_x$ during normal operation, and there is no known technology that is available to take advantage of their economy without suffering the penalty of NO$_x$ emissions.

When primary measures (actions that affect the combustion process itself) are taken to reduce NO$_x$ in lean-burn engines, fuel economy is also usually reduced and particulate emissions are increased. On the other hand, combustion conditions selected to reduce pollution from particulates and obtain good fuel economy, tend to Increase NO$_x$. This tradeoff is most severe under high load conditions, where both fuel economy and NO$_x$ emissions are of most concern.

Current strategies to lower NO$_x$ emissions include: optimized fuel/air mixing, fuel injection rate shaping, high injection pressures, intercoolers, exhaust gas recirculation (EGR) and NO$_x$-reducing catalysts. State of the art NO$_x$ reduction is limited by cost and commercial practicalities. In addition, the likely need to employ lean-burn engines to meet fuel economy goals, makes achievement of emission goals even more difficult.

Catalytic systems for emissions control have several disadvantages. Catalysts useful for conventional gasoline engines are generally not effective for diesel and lean-burn gasoline engines. Reagent-based NO$_x$-reduction catalysts have been proposed with ammonia, urea or hydrocarbons like diesel fuel. However, non-fuel reagents like ammonia and urea require a separate filling operation. And, using fuel as the reagent reduces fuel economy and involves an additional cost In terms of the tax on the fuel.

There is a current need for an economical and effective answer to the problems associated with reducing NO$_x$ without suffering major penalties in fuel consumption or particulate emissions, particularly for mobile diesel and other lean-burn engines.

BACKGROUND ART

Intensive investigations over about the last decade have made a number of technologies available for NO$_x$ reduction. As briefly noted above, however, no one technology has proved to be effective for achieving the dual goals of fuel economy and low emissions of pollutants. The art has not developed a technology singly, or by combining two or more available strategies, to meet projected regulatory demands for fuel economy with low NO$_x$ emissions.

SCR catalysts are available to limit NO$_x$ emissions from diesel engines, but even though some success has been achieved in this area, no one has yet solved the problem of significant down times. SCR is effective in a practical sense when the exhaust gas temperatures are sufficiently elevated, and effective temperatures are not achieved during startup or idling. Moreover, its effectiveness depends on the operator maintaining a supply of reagent and monitoring the activity of the catalyst. These are limitations that are viewed as unfavorable to regulators. A national or regional policy, so limited, could be rendered ineffective simply by a significant number of operators failing to take the time to stop for a refill of reagent or to service their systems. Thus, the problem of refilling with reagent goes deeper than simply the convenience of the driver or other operator.

In addition to these factors, R. J. Hulterman, in "A Selective Catalytic Reduction Of NO$_x$ from Diesel Engines Using Injection Of Urea" (Ph.D. thesis, September 1995) describes a number of technical challenges for implementing urea-SCR, including clogging of atomizers, decomposition problems and system dynamics. And, as he points out, the incentives to employ ammonia-SCR may be less due to the hazards associated with it. Both U.S. Pat. No. 5,431,893, to Hug, et al., and European Patent Specification 615,777 A1, further address problems with SCR. The costs associated with these problems and the fact that SCR is ineffective over a significant portion of the operating cycle of a mobile engine have played a role in the limited successes seen today for SCR.

Primary measures, as noted above, have also been found to provide less than a full solution to the problem of NO$_x$ reduction with fuel economy. At a fixed load, as EGR is employed, both brake specific fuel consumption (bsfc) and particulate emissions increase. In this regard, see Psaras, et al, "Achieving the 2004 Heavy-Duty Diesel Emissions Using Electronic EGR and a Cerium Based Fuel Borne Catalyst", SAE Technical Paper Series No. 970189, 1997.

The art is awaiting the development of a process and apparatus that would permit reducing NO$_x$ without suffering undue penalties in either fuel consumption or particulate emissions, and to do so simply, reliably, economically and safely.

DISCLOSURE OF INVENTION

It is an object of the invention to provide a system for reducing NO$_x$ emissions from a lean-burn internal combustion engine while enabling good fuel economy.

It is another object of the invention to enable NO$_x$ reduction over the entire operating range of an engine.

It is yet another object of the invention to optimize fuel economy while achieving reductions in emissions of NO$_x$, particulates, unburned hydrocarbons and carbon monoxide.

It is still another object of the invention to reduce the amount of NO$_x$-reducing reagent required for SCR operation.

It is another object of the invention to enable reduced particulate emissions due to light load EGR and advanced timing, without sacrificing either fuel economy or NO$_x$ reduction at high load.

It is a related object of the invention to eliminate the trade-off problems associated with known strategies for achieving NO$_x$ reduction along with fuel economy and low particulate emissions.

It is another object of the invention to provide a system for lean-burn engines that will be acceptable to regulators concerned that operators, especially in mobile applications, might circumvent low emissions strategies by reason of convenience, neglect or simple regulatory compliance.

It is another object of the invention to provide a system that gives operators, especially in mobile applications, an economic incentive to maintain their pollution control systems.

It is a further object of the invention to provide an emissions control strategy that employs nitrogenous NO$_x$-reducing reagents, such as ammonia and urea, without a problem of ammonia emissions at light load.

These and other objects are achieved by the present invention, which provides an improved process and apparatus for $NO_x$ reduction with fuel economy and particulate control. The process, in one of its aspects, comprises: providing an exhaust system having an exhaust passage leading to a catalytic reactor effective for $NO_x$ reduction; providing means for mixing exhaust gases from said exhaust passage and incoming air and supplying the resulting mixture to the engine; sensing operating parameters indicative of conditions effective for catalytic $NO_x$ reduction; generating an observation signal representative of sensed operating parameters; comparing the observation signal to a reference value to determine if catalytic $NO_x$ reduction can be effectively operated; generating a control signal representative of the results of the comparison; and operating either said catalytic reactor and/or said EGR unit in response to said control signal.

The method and apparatus are effective for diesel and gasoline leanburn engines, particularly, and other lean burn engines as well. The catalytic unit can be either an SCR unit or comprise a lean-$NO_x$ catalyst. Typically, the catalytic reactor and the associated preferred reagent supply means are enabled at the effective operating temperature for the catalyst, e.g., when the exhaust gases are within the range of from about 200 to about 650° C.

According to one embodiment, the catalytic reactor is an SCR unit and a $NO_x$-reducing reagent is introduced into the exhaust gas when the reactor is enabled. In another embodiment, the catalytic reactor comprises a lean-$NO_x$ catalyst. In one form, a hydrocarbon is fed to the lean-$NO_x$ catalyst when enabled.

One embodiment of the apparatus comprises: an exhaust system having an exhaust passage leading to a catalytic reactor effective for $NO_x$ reduction; means to mix exhaust gases from said exhaust passage and incoming air and to supply the resulting mixture to the engine; sensing means for sensing operating parameters indicative of conditions effective for catalytic $NO_x$ reduction and generating an operation signal representative thereof; control means for comparing the operation signal to reference value, determine if catalytic $NO_x$ reduction can be effectively operated, and generate a control signal representative thereof; and means responsive to said control signal for operating either said catalytic reactor and/or said EGR unit.

BRIEF DESCRIPTION OF THE DRAWINGS

The invention will be better understood and its advantages more apparent from the following detailed description, especially when read in light of the accompanying drawings, wherein.

DETAILED DESCRIPTION OF A PREFERRED EMBODIMENT

Figure 1:
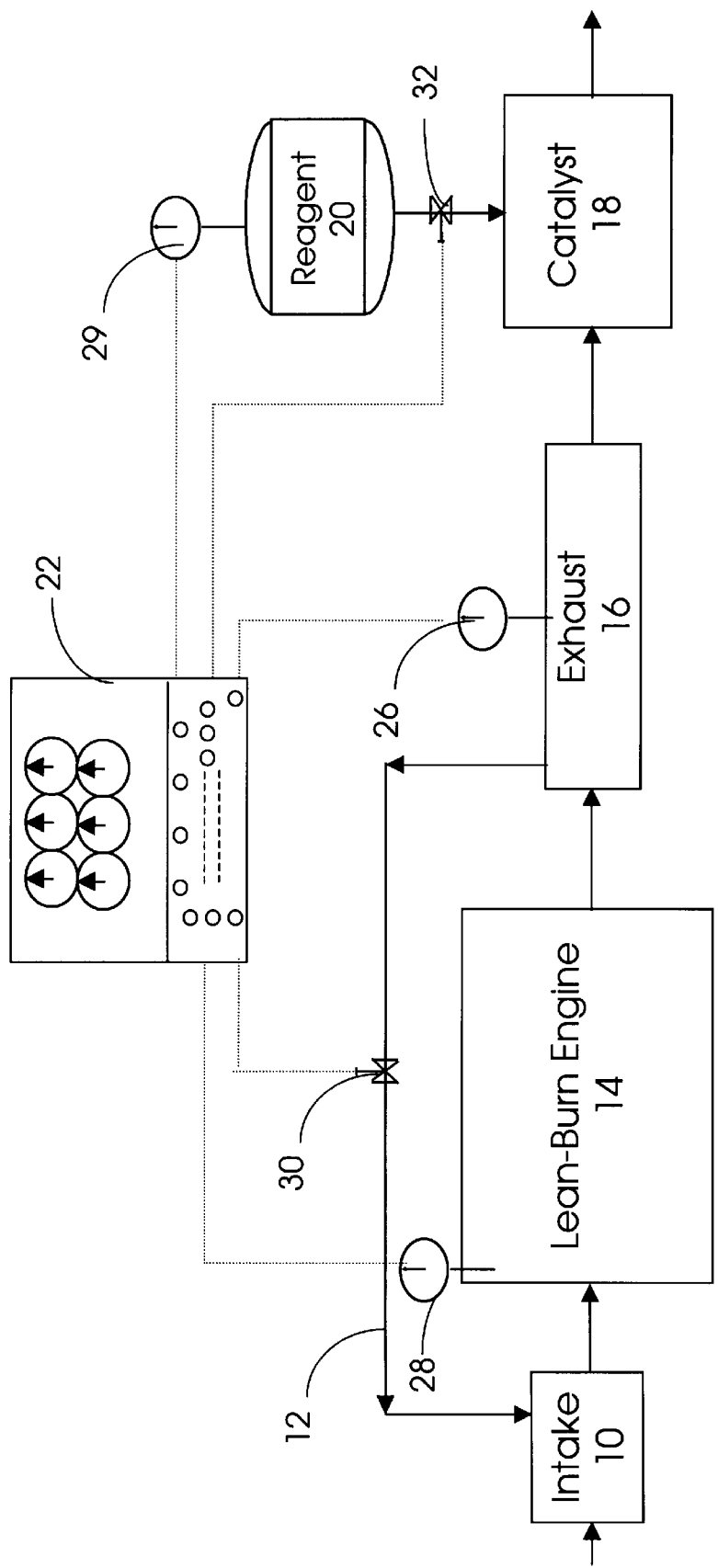
FIG. 1 is a flow diagram showing principal components of one embodiment of the invention employing exhaust gas recirculation and SCR.

In this description, the term "lean-burn engine" is meant to include engines that can be operated with at least a 1% excess of oxygen by weight over the amount required by stoichiometry for complete combustion of a hydrocarbon fuel. The term "engine" is meant in the broad sense to include all combustors which combust fuel to provide heat, e.g., for direct or indirect conversion to mechanical or electrical energy. Internal combustion engines of the Otto, Diesel and turbine types, as well as burners and furnaces, are included and can benefit from the invention. However, since the problems and advantages of successful achievement of reliable $NO_x$ reduction on diesel engines are so pronounced, the diesel engine is used throughout this description for purposes of example. Stationary and mobile engines are contemplated.

The term "Diesel engine" is meant to include all compression-ignition engines, for both mobile (including marine) and stationary power plants and of the two-stroke per cycle, four-stroke per cycle and rotary types.

The term "hydrocarbon fuel" is meant to include all of those fuels prepared from "distillate fuels" or "petroleum". Gasoline, jet fuel, diesel fuel, and various other distillate fuels are included. The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, antioxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

The term "SCR" as used herein refers to a process known in the art as selective catalytic reduction. These processes and the invention can utilize ammonia or any $NO_x$-reducing reagent capable of generating ammonia gas upon heating. Preferred among these materials are those that comprise a member selected from the group consisting of: ammelide; ammeline; ammonium carbonate; ammonium bicarbonate, ammonium carbamate; ammonium cyanate; ammonium salts of inorganic acids, including sulfuric acid and phosphoric acid; ammonium salts of organic acids, including formic and acetic acid; biuret; cyanuric acid; hexamethylenetetramine and its carbonates; isocyanic acid; lower alkyl amines, such as methyl amine, ethyl amine, dimethyl amine; melamine; tricyanourea, urea and mixtures of any number of these. The term "urea" is meant to encompass urea in all of its commercial forms. Typically, commercial forms of urea will consist essentially of urea, containing 95% or more urea by weight.

Aqueous solutions of urea, ammonia (ammonium hydroxide) or any of the other reagents can be employed where desired. It is preferred to use as little water as necessary due to the added expense of carrying and vaporizing the water. Also in the absence of water, the time necessary to gasify the urea or other reagent is minimized, making the size of the equipment smaller than when water or other solvent must be volatilized. It is an advantage of the invention, however, that water can be employed strategically to maintain a low, but effective temperature in the exhaust—a result not usually desirable for SCR, but helpful where the nature of the catalyst, or other equipment such as associated valves and the like, can benefit. Water can be employed in concentrations known to the art, e.g., from about 5% to about 65% (or more in the case of slurries), but will typically be present (if employed) in concentrations of from about 25% to about 50% by weight of the reagent solution.

The term "lean-$NO_x$ catalyst" is used herein in the same manner as it is in the art, to define a catalyst system effective to reduce $NO_x$ in the exhaust of a lean-burn engine. Typically, these catalysts require the use of a hydrocarbon reagent (e.g., fuel, most conveniently). In this regard, see Heimrich, "Demonstration of Lean $NO_x$ Catalytic Converter Technology on a Heavy Duty Diesel Engine", SAE Technical Paper Series No. 970755, 1997, the disclosure of which is incorporated by reference. Some success has been had with catalysts effective without hydrocarbon reagents.

The technology of "exhaust gas recirculation" (EGR) is well developed and the term is used herein in the same manner used in the art. Typically, a portion of exhaust gases from combustion chamber(s) of an engine is recirculated to one or more of the combustion chambers with combustion air. A portion of exhaust gases can be separated from an exhaust manifold or line therefrom and mixed with incoming air by suitable means such as described by Showalter in U.S. Pat. No. 4,609,342, the disclosure of which is incorporated by reference herein.

The process of the embodiment FIG. 1 shows a lean-burn engine with exhaust gas recirculation and an SCR system. The combined EGR/SCR system is controlled to recirculate exhaust gas at times of low-load, during warm-up, and/or when the SCR system would be ineffective. The EGR system will thus reduce $NO_x$ at times when the exhaust temperature is too low for the best use of SCR, when reagent supply has been exhausted and/or when mechanical problems or catalyst inactivation occur.

During EGR operation, combustion air from intake 10 (at high or low pressure, heated or cooled) and exhaust gases from line 12 (separated from the main exhaust gas stream 16) are mixed and fed to one or more cylinders of engine 14 (e.g., either diesel or lean-burn gasoline). The proportion of exhaust gases recirculated to the engine for forming a combustion air mixture will be effective to lower the production of $NO_x$ by the engine utilizing the combustion air mixture as compared to combustion air not containing exhaust gases. Typically, from about 0 to about 30% can be recirculated.

The combustion air mixture is typically compressed prior to introduction into engine cylinder(s) wherein it is further compressed, causing heating. The appropriate fuel is injected into the cylinders following compression for diesel engines but can be injected sooner for spark-ignition engines. The fuel is then combusted with the combustion air mixture to produce exhaust gases which are discharged through exhaust stream 16. The cycle just described is repeated continuously as the engine continues to run in the EGR mode. EGR lowers the combustion temperature and reduces the amount of $NO_x$ produced, but as has been observed, it increases production of particulates and unburned hydrocarbons at high loads—again, the compromise between $NO_x$ and complete combustion.

It is an advantage of the invention that EGR can be shut down at high loads and the fuel consumption and emissions penalties that it would cause at high loads can be avoided. Another advantage of the invention is that, because EGR is not operating at high loads (unless reagent is exhausted), less particulates are recirculated back to the engine where they could cause combustion or mechanical problems. Indeed, the EGR equipment might realize savings in cost because it need not be as robust as when it is continuously employed during all loads.

Downstream of exhaust stream 16 is an SCR unit 18. SCR is effective within a relatively narrow temperature window of from about 180 to about 650° C. During high-load conditions, the exhaust temperature is maintained at the temperatures most preferred for SCR—and, at these temperatures, $NO_x$ conversions of greater than 90% and above are realistic and $NO_x$-reducing reagent is fed from suitable supply vessel 20. However, there remain times such as during start up and idling that the temperature is not high enough. During these times, ammonia or other reagent is preferably not introduced into the exhaust because it will simply pass through and foul the air.

FIG. 1 also illustrates a control system of a type useful to maintain the proper operation of EGR and SCR units and determine the level of reagent introduction (i.e., dosage). The controller 22 can, if desired, time the injections to occur at staggered times in a predetermined sequence designed to smooth out the rate of introduction despite the use of pulsed injectors. The temperature of the exhaust (sensor means 26) is one parameter of importance. Engine load is another key parameter (sensor means 28), and this or like factor can be monitored to determine the amount of $NO_x$ being generated and the need for $NO_x$-reducing reagent fed to exhaust gases. Sensor means 29 is preferably provided to determine the availbility of $NO_x$-reducing reagent in reagent vessel 20.

The sensing means provided for sensing operating parameters indicative of conditions effective for catalytic $NO_x$ reduction, sense the appropriate operating parameter and generate an operation signal representative thereof. The controller 22 provides control means for comparing one or more operation signals to appropriate reference value(s) and determines if catalytic $NO_x$ reduction can be effectively operated. The controller then generates appropriate control signals representative of the result of the comparison. Means are provided to be responsive to the control signals for operating either said catalytic reactor or said EGR unit, as called for by the controller. FIG. 1 shows, as representative of these latter means, valves 30 and 32.

It is an advantage that the usually-occurring spikes or discontinuities in $NO_x$ levels can be better tracked with injection of reagent and/or EGR in the proper process configuration. It is another advantage of the invention that once the controller senses low-load operation, the SCR unit can remain on long enough to use up any reagent in the feed system—thereby eliminating or greatly reducing the problem of ammonia slip normally associated with SCR units.

The SCR reagent can be fed into the exhaust gas, in response to a feed-forward controller in response to a number of measured parameters, including: engine load as represented by various mechanical or electronic measures such as fuel flow, tack or pulse width, engine speed, intake air temperature; barometric pressure; intake air humidity; exhaust gas temperature and/or other parameters effective for particular engines. In addition, to the extent that sensors are available, trim or feed back control can be provided based on residual gas species following the catalyst, e.g., the level of $NO_x$, HC or CO. If desired, feedback control can be employed to trim the system In response to residual levels of ammonia, other gas species, or any other measurable engine or exhaust gas property.

The urea, or other reagent or active species, is introduced into the exhaust gases in an amount sufficient to provide the degree of $NO_x$ reduction desired. The desired amount can be dictated by regulation, engine design requirements or other criteria. Typically, a molar ratio of the active species to the baseline nitrogen oxides level (by which is meant the pretreatment level of $NO_x$ in the effluent) of at least about 0.3:1 will be employed. More narrowly, the reagent is supplied to provide a molar ratio of active species to baseline nitrogen oxides of about 0.5:1 to about 1:1. The reagent levels or target $NO_x$ concentrations in the exhaust can be preprogrammed into the controller based on tested values for given fuel flows and related parameters, or sensors and related controls can be provided to provide real-time readouts. A sensor means might be provided to correct preprogrammed values by feedback control.

The SCR catalyst used is one capable of reducing the effluent nitrogen oxides concentration in the presence of ammonia. These include, for instance, activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, or mixtures of these. Other SCR catalyst materials conventional in the art and familiar to the skilled artisan can also be utilized. These SCR catalyst materials are typically mounted on a support such as a metal, ceramic, zeolite, or homogeneous monolith, although other art-known supports can also be used.

Among the useful SCR catalysts are those representative prior art processes described below. Selective catalytic reduction processes for reducing $NO_x$ are well known and utilize a variety of catalytic agents. For instance, in European Patent Application WO 210,392, Eichholtz and Weiler discuss the catalytic removal of nitrogen oxides using activated charcoal or activated coke, with the addition of ammonia, as a catalyst. Kato et al. in U.S. Pat. No. 4,138,469 and Henke in U.S. Pat. No. 4,393,031 disclose the catalytic reduction of $NO_x$ using platinum group metals and/or other metals such as titanium, copper, molybdenum, vanadium, tungsten, zeolites or oxides thereof with the addition of ammonia to achieve the desired catalytic reduction.

Another catalytic reduction process is disclosed by Canadian Patent 1,100,292 to Knight, which relates to the use of a platinum group metal, gold, and/or silver catalyst deposited on a refractory oxide. Mori et al. in U.S. Pat. No. 4,107,272 discuss the catalytic reduction of $NO_x$ using oxysulfur, sulfate, or sulfite compounds of vanadium, chromium, manganese, iron, copper, and nickel with the addition of ammonia gas.

In a multi-phased catalytic system, Ginger, in U.S. Pat. No. 4,268,488, discloses exposing a nitrogen oxides containing effluent to a first catalyst comprising a copper compound such as copper sulfate and a second catalyst comprising metal combinations such as sulfates of vanadium and iron or tungsten and iron on a carrier in the presence of ammonia.

The effluent containing gasified SCR reagent is most preferably passed over the SCR catalyst while the effluent is at a temperature between about 100° C. and about 650° C., preferably at least 180° C. In this manner, the active species present in the effluent due to hydrolysis and gasification of the reagent solution most effectively facilitates the catalytic reduction of nitrogen oxides. Use of the present invention with any of the above SCR catalysts (the disclosure of which are specifically incorporated by reference) reduces the requirement for the transport, storage and handling of large amounts of ammonia or ammonium water.

Figure 2:
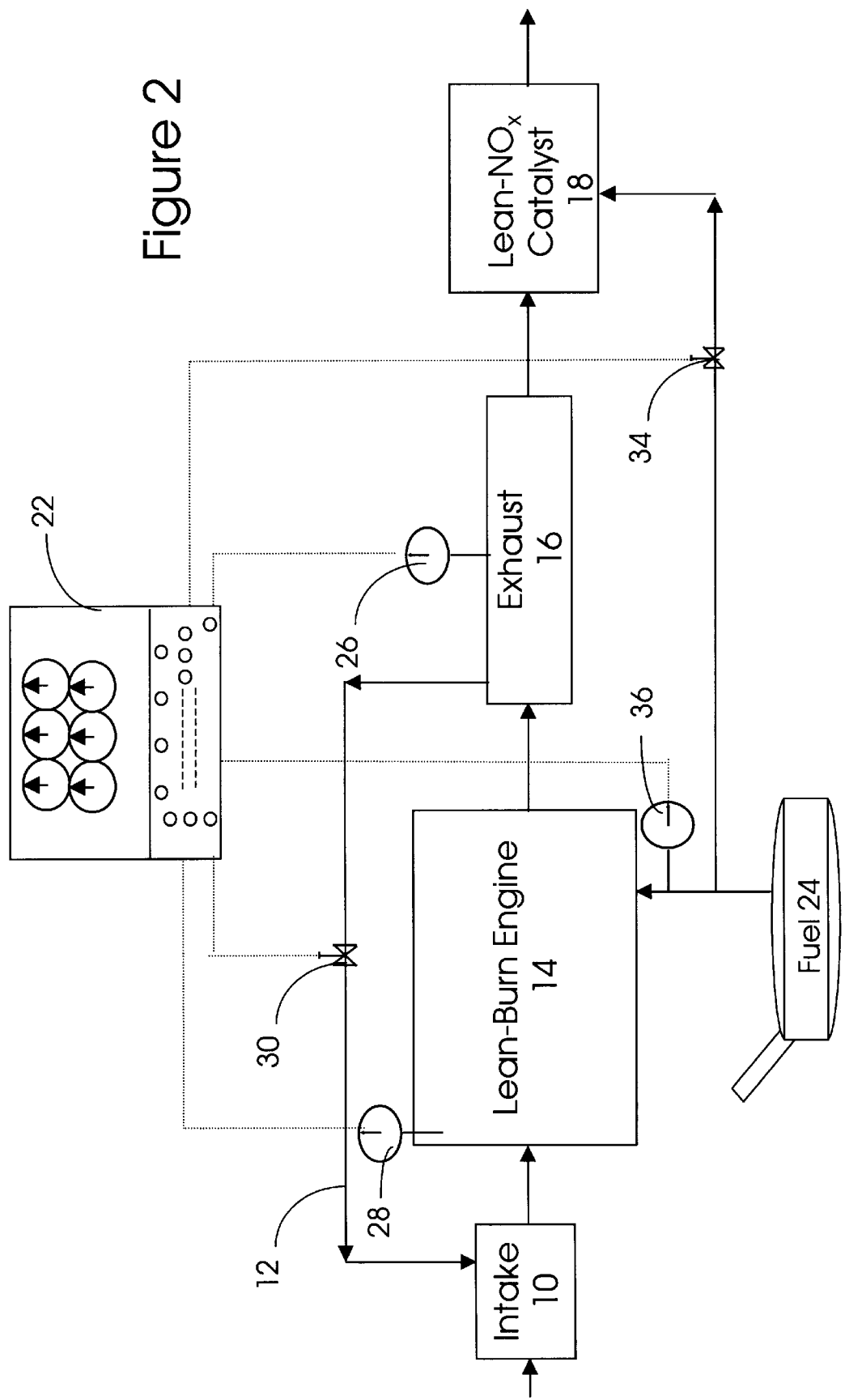
FIG. 2 is flow diagram showing principal components of another embodiment of the invention employing exhaust gas recirculation and a lean-$NO_x$ catalyst, optionally supplemented by hydrocarbon (fuel) feed.

FIG. 2 is flow diagram, similar to FIG. 1, but showing principal components of another embodiment of the invention employing exhaust gas recirculation and a lean-$NO_x$ catalyst, optionally supplemented by hydrocarbon (fuel) feed. Here, no separate vessel is required for $NO_x$-reducing reagent, but the fuel in the tank 24 can be employed. Valve 34, like valve 32 in FIG. 1, is actuated as controlled by controller 22 to supply fuel as needed by the catalyst 18, in this case a lean-$NO_x$ catalyst such as described in Heimrich, "Demonstration of Lean $NO_x$ Catalytic Converter Technology on a Heavy Duty Diesel Engine", SAE Technical Paper Series No. 970755, 1997. Some catalysts are available to, at least during a portion of the load cycle, operate without reagent (fuel or other hydrocarbon) feed. Note also, sensor 36 employed to sense fuel flow as an indicator of engine load.

The invention is compatible with the use of fuel catalysts that can improve engine performance, reduce emissions and/or improve the operation of catalytic exhaust treatment units or particulate traps. For example, the fuel can be catalyzed with a suitable platinum group metal additive and/or auxiliary catalyst composition selected from the group consisting of compounds of sodium, lithium, potassium, calcium, magnesium, cerium, iron, copper, manganese, and mixtures. Among the compounds are any of those disclosed for example in prior U.S. Pat. Nos. 4,892,562 and 4,891,050 to Bowers and Sprague, 5,034,020 to Epperly and Sprague, 5,215,652 to Epperly, Sprague, Kelso and Bowers, and 5,266,083 to Peter-Hoblyn, Epperly, Kelso and Sprague, WO 90/07561 to Epperly, Sprague, Kelso and Bowers, and U.S. patent application Ser. No. 08/597,517, filed Jan. 31, 1996, by Peter-Hoblyn, Valentine and Sprague, hereby incorporated by reference. Where the application permits, a blend of these compounds can be used with one or more other platinum group metal compounds such as soaps, acetyl acetonates, alcoholates, β-diketonates, and sulfonates, e.g., of the type which will be described in more detail below.

The platinum group metal catalyst and/or other catalyst can be added in any manner effective for its intended purpose, such as by adding it to the fuel in bulk storage, to the fuel in a tank associated with the engine, or by continuous or intermittent addition, such as by a suitable metering device, into: the fuel line leading to the engine, or in the form of a vapor, gas or aerosol into the air intake, the exhaust gases before the trap, exhaust gases after the trap but before recirculation to the engine, or a mixing chamber or equivalent means wherein the exhaust gases are mixed with incoming air.

When employed, particularly in combination with particulate traps, platinum group metal catalyst compositions are preferably employed at concentrations of less than 1 part by weight of platinum group metal per million parts by volume fuel (ppm). For the purposes of this description, all "parts per million" figures are on a weight to volume basis, i.e., grams/million cubic centimeters (which can also be expressed as milligrams/liter), and percentages are given by weight, unless otherwise indicated. Auxiliary catalysts are employed at levels effective for their intended purpose, preferably at levels of from 1 to 100 ppm of the fuel utilized, e.g., 10 to 60 ppm.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

I claim:

1. A method for operating a lean-burn engine with good fuel economy and reduced emissions of $NO_x$, particulates, gaseous hydrocarbons and carbon monoxide, comprising:

providing an exhaust system having an exhaust passage leading to a catalytic reactor effective for $NO_x$ reduction by selective catalytic reduction utilizing a $NO_x$-reducing reagent selected from the group consisting of ammelide, ammeline, ammonium carbonate, ammonium bicarbonate, ammonium carbamate, ammonium cyanate, ammonium salts of inorganic acids, ammonium salts of organic acids, biuret, cyanuric acid, hexamethylenetetramine, isocyanic acid, lower alkyl amines, melamine, tricyanourea and urea;

providing means for mixing exhaust gases from said exhaust passage and incoming air and supplying the resulting mixture to the engine;

sensing operating parameters indicative of conditions effective for catalytic $NO_x$ reduction;

generating an operation signal representative of sensed operating parameters;

comparing the operation signal to a reference value to determine if catalytic $NO_x$ reduction can be effectively operated;

generating a control signal representative of the results of the comparison; and operating at least one of said catalytic reactor and/or said EGR unit in response to said control signal.

2. A method according to claim 1 wherein the catalytic reactor is enabled when the temperature of the exhaust gases is within the range of from about 200 to about 650° C.

3. A method according to claim 2 wherein the catalytic reactor comprises a lean-$NO_x$ catalyst.

4. A method according to claim 3 wherein a hydrocarbon is fed to the lean-$NO_x$ catalyst when enabled.

5. An apparatus for controlling the operation of a lean-burn engine to obtain good fuel economy and low emissions of $NO_x$ and particulates, comprising:

an exhaust system having an exhaust passage leading to a catalytic reactor effective for $NO_x$ reduction by selective catalytic reduction;

means to mix exhaust gases from said exhaust passage and incoming air and to supply the resulting mixture to the engine;

sensing means for sensing operating parameters indicative of conditions effective for catalytic $NO_x$ reduction and generating an operation signal representative thereof;

control means for comparing the operation signal to reference value, determine if catalytic $NO_x$ reduction can be effectively operated, and generate a control signal representative thereof; and means responsive to said control signal for operating at least one of said catalytic reactor and/or said EGR unit.

* * * * *